Figure 1:
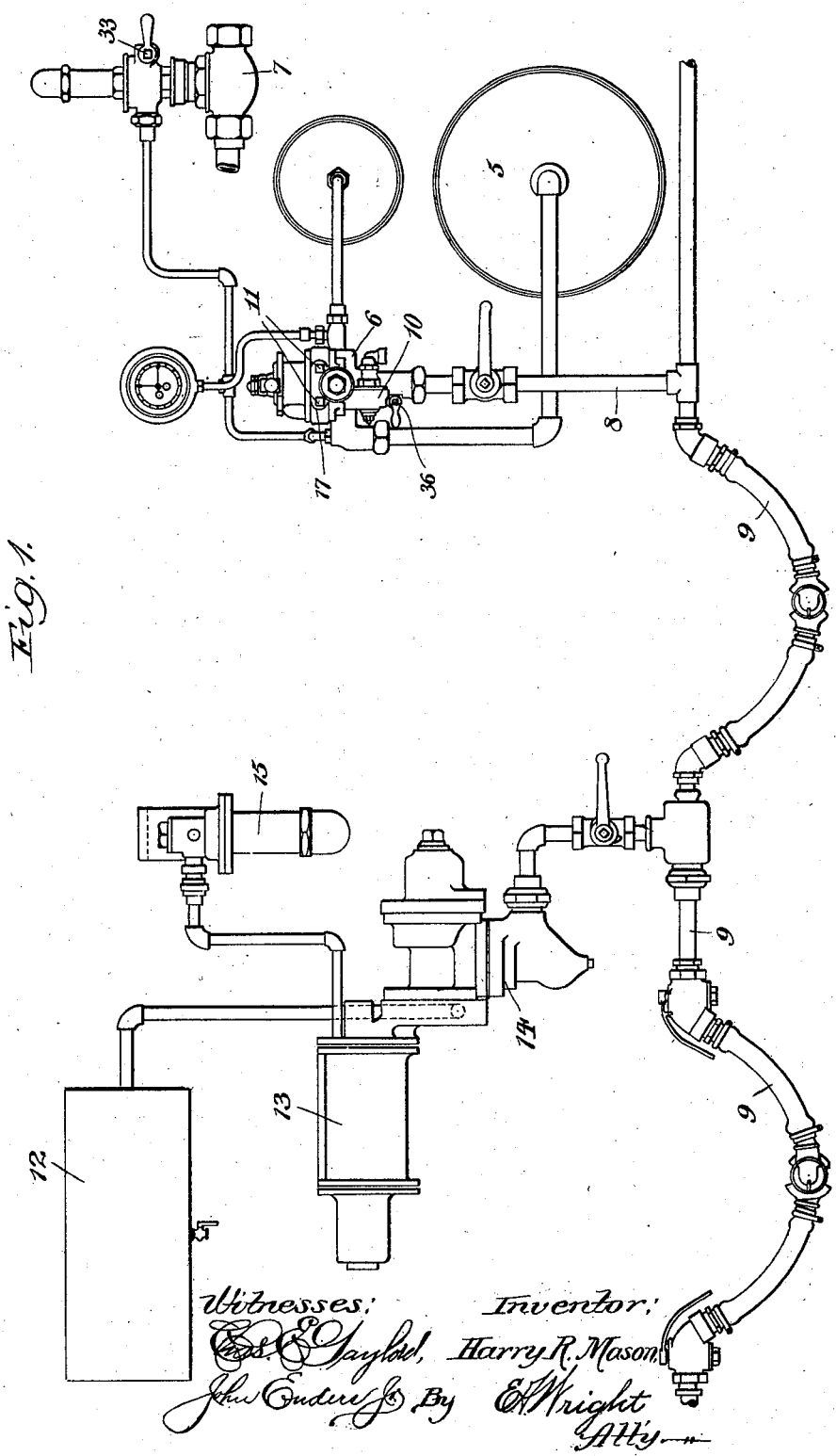

No. 718,491. PATENTED JAN. 13, 1903.
H. R. MASON.
FLUID PRESSURE MECHANISM.
APPLICATION FILED MAY 8, 1901.
NO MODEL. 4 SHEETS—SHEET 1.

No. 718,491. PATENTED JAN. 13, 1903.
H. R. MASON.
FLUID PRESSURE MECHANISM.
APPLICATION FILED MAY 8, 1901.
NO MODEL. 4 SHEETS—SHEET 2.

Witnesses:
Inventor:
Harry R. Mason,
By
Atty

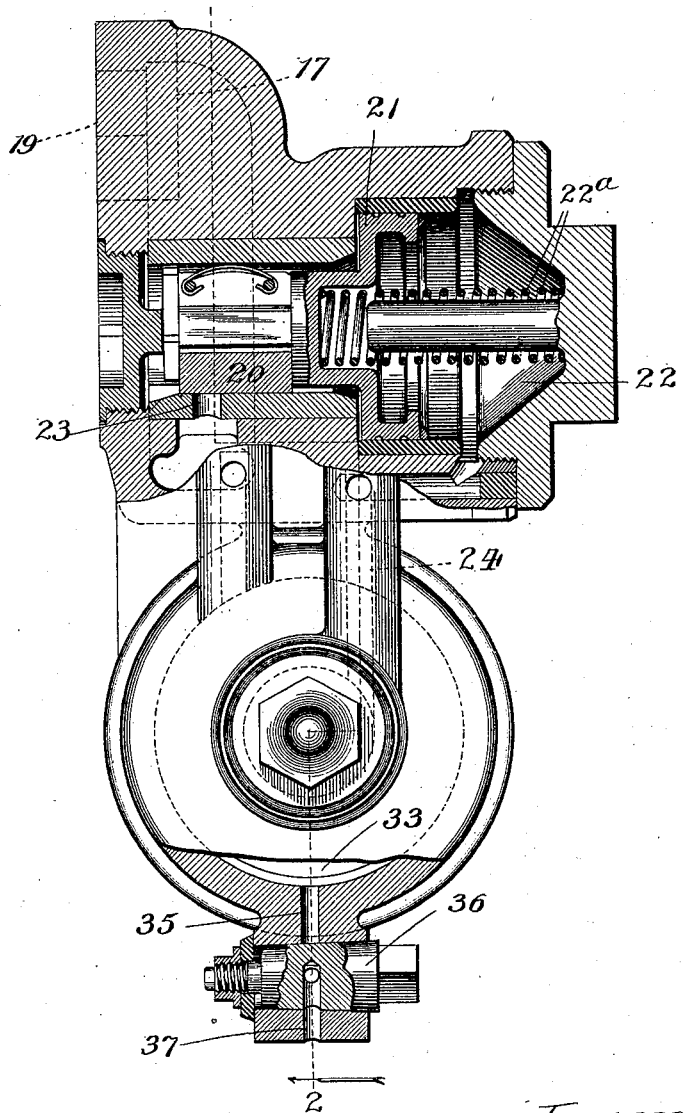

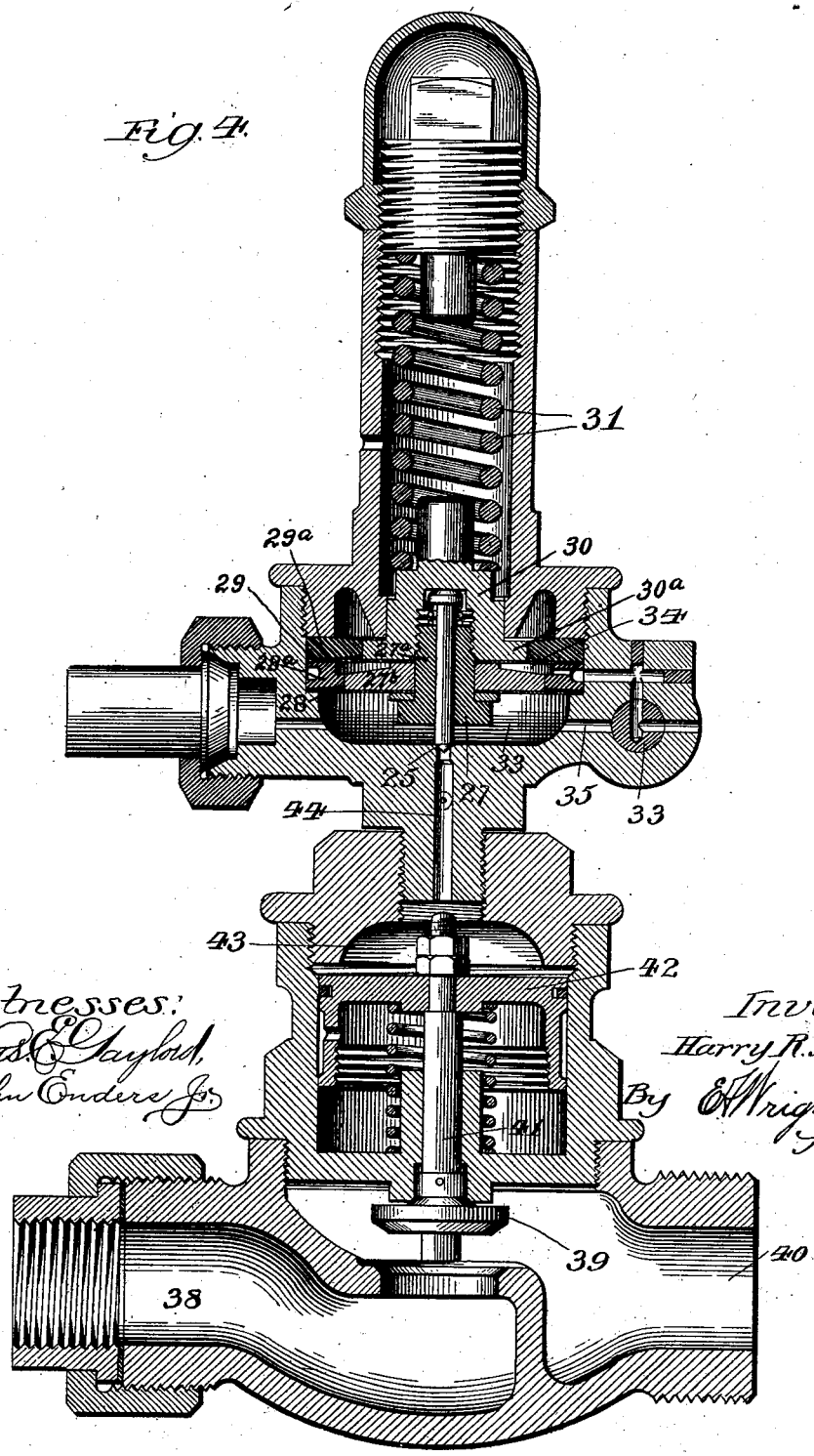

UNITED STATES PATENT OFFICE.

HARRY R. MASON, OF CHICAGO, ILLINOIS, ASSIGNOR TO THE WESTING-HOUSE AIR BRAKE COMPANY, OF PITTSBURG, PENNSYLVANIA, A CORPORATION OF PENNSYLVANIA.

FLUID-PRESSURE MECHANISM.

SPECIFICATION forming part of Letters Patent No. 718,491, dated January 13, 1903.

Application filed May 8, 1901. Serial No. 59,242. (No model.)

*To all whom it may concern:*

Be it known that I, HARRY R. MASON, a citizen of the United States, residing at Chicago, in the county of Cook and State of Illinois, have invented certain new and useful Improvements in Fluid-Pressure Mechanism, of which the following, taken in connection with the accompanying drawings, is a specification.

My invention has relation to the provision of an improved form of fluid-pressure mechanism in which the fluid-pressure is arranged to actuate a controlling device of novel construction so devised that it can be brought into operation at any one of a plurality of pressures at will by the manipulation of a suitable manually-operated device, which will be described more in detail hereinafter in connection with the accompanying drawings.

My invention is particularly useful in situations where it is desired to control the action of a compressor automatically by means of pressure generated or stored in some receiver or other storage chamber or pipe. Such a situation may be found, for example, in what is known as the "high-speed" brake now coming into use on some of the fast trains in this country, and it is in connection with such apparatus that I have illustrated my invention in the accompanying drawings. Such apparatus is constructed so that it may be operated at the will of the engineer at either one of two pressures. The ordinary working pressure of an air-brake is seventy pounds in the train-pipe and ninety pounds in the main or storage reservoir on the locomotive, while the corresponding pressures used most frequently in connection with the high-speed brake are considerably in excess of those figures, the train-pipe pressure being sometimes as high as one hundred pounds or more and the main-reservoir pressure one hundred and ten pounds or more.

In order to meet the conditions above recited, the apparatus heretofore in most common use has been usually provided with two separate feed-valves located somewhere upon the engine, in connection with a suitable cock for throwing either one or the other into operation as it was desired to use one or the other for supplying the train-pipe with air, one of said valves being adjusted at seventy pounds and the other at one hundred pounds. These two feed-valves as heretofore used have been necessarily somewhat bulky in construction and had to be placed somewhere at a distance from the engineer's brake-valve, generally at a point out of reach of the engineer—as, for example, under the running-board. The apparatus heretofore employed also required a governor-head containing two separate governor devices each provided with a separate pipe connection, one set at ninety pounds and the other at one hundred and ten pounds, the one set at ninety pounds being provided with a cut-off cock, so that it could be rendered inoperative when it was desired to carry one hundred and ten pounds in the main reservoir. Connection from the two feed-valves to the engineer's brake-valve was secured by the use of a suitable pipe-bracket attached to the engineer's brake-valve and pipe connections leading therefrom to the reversing-cock in the feed-valve casing under the running-board.

One of the objects of my present invention is to provide a mechanism which will perform all the requisite functions heretofore performed by the devices above referred to with the use of a considerably less number of parts.

Another object is to effect by simplification a material reduction in size, so as to render it practicable to place the mechanism for controlling the train-pipe pressure directly upon the engineer's brake-valve, which will eliminate all pipe connections between such mechanism and the brake-valve, reduce the chance of leakage, and enable the engineer to have ready access to this mechanism at all times without the necessity of leaving his seat in the cab.

Another object of my present invention is to increase the reliability and at the same time decrease the cost of repairs in devices of this kind, which object is accomplished primarily by the simplification in structure and reduction in the number of parts already referred to.

The above as well as such other objects as may hereinafter appear I attain by means of a construction which I have illustrated in preferred form in the accompanying drawings, in which—

Figure 2:
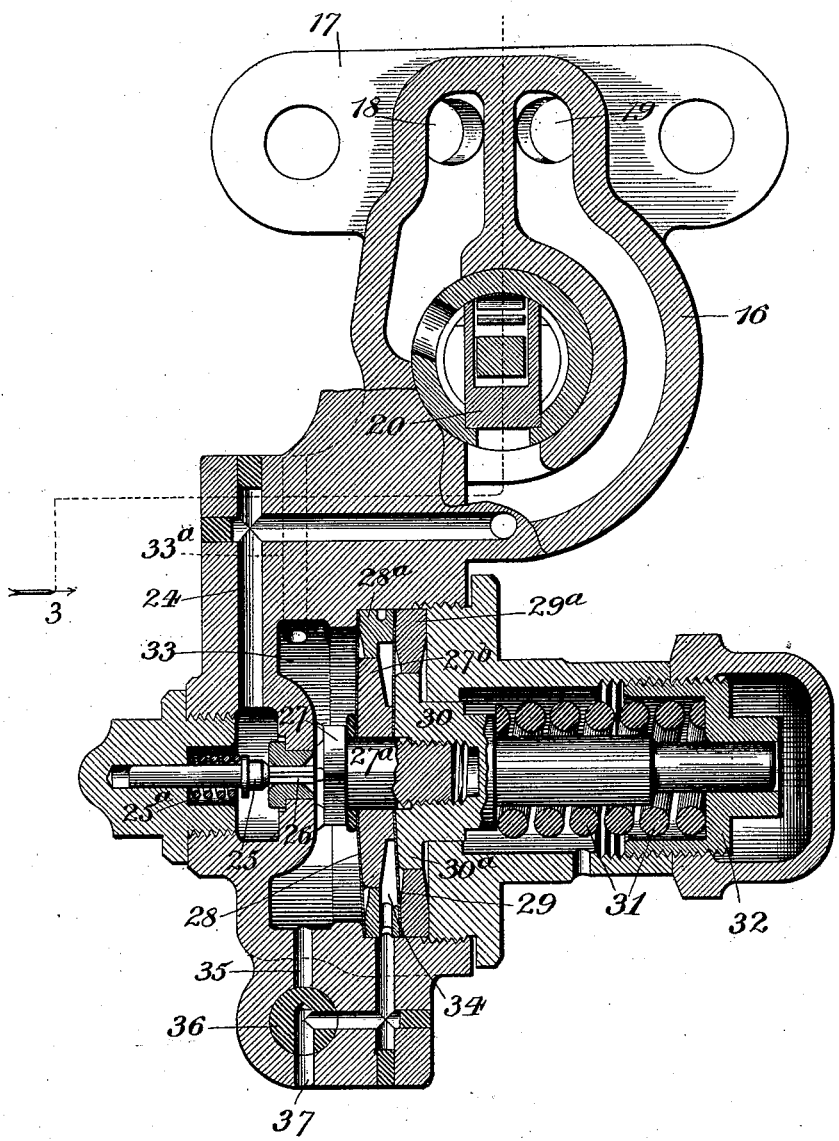

Figure 1 is a diagrammatic representation showing my improvements applied in connection with a high-speed-brake apparatus. Fig. 2 is a sectional view on a vertical plane through the feed-valve employed in the apparatus shown in Fig. 1 for controlling the train-pipe pressures. Fig. 3 is another sectional view of the said feed-valve device taken on the line 3 of Fig. 2, and Fig. 4 is a vertical section through the governor employed in the high-speed brake referred to for controlling the operation of the pump and determining the amount of pressure stored in the main reservoir.

Referring now more particularly to Fig. 1, it will be seen that I have therein illustrated the mechanism to be used in connection with a high-speed brake on a locomotive comprising a main reservoir 5, an engineer's brake-valve 6, a pump-governor 7, a train-pipe 8 and 9, and a feed-valve 10, embodying my improvements, which is shown as secured to the engineer's brake-valve and held in place thereon by means of the bolts 11 in the position usually occupied by the single feed-valve employed in the ordinary air-brake equipment. Fig. 1 also shows diagrammatically the braking apparatus used for a high-speed brake on a single car comprising a continuation of the train-pipe 9, an auxiliary reservoir 12, the brake-cylinder 13, the triple valve 14, and the high-speed-brake automatic reducing-valve 15.

Referring now more particularly to Fig. 2, it will be seen that the feed-valve mechanism employed in conjunction with the engineer's brake-valve 6 is mounted in a casing 16, attached by means of the lugs 17 and the bolts 11 to the engineer's brake-valve, with the inlet-opening 18 registering with the connection in the brake-valve that comes from the main reservoir and the outlet-opening 19 registering with the connection in the body of the brake-valve which leads to the train-pipe, the passage of air from one of these openings to the other for the main supply of the train-pipe being controlled through movement of the supply-valve 20, actuated by the supply-piston 21, the arrangement of the supply-valve and piston being substantially the same as that already in use.

The pressure in the chamber 22, which acts upon the piston 21 to balance the pressure on the other side thereof and permit the supply-valve spring 22ª to push the slide-valve 20 over and cut off the supply of air to the train-pipe through the port 23, is led through a passage 24, which is controlled by means of the feed-valve 25, the stem 26 of which bears against the bolt-head 27, which moves with and is adapted to hold in place two diaphragms 28 and 29, one of which, 28, has a larger effective area than the other, the said diaphragms at their central portion being rigidly secured so as to move with the diaphragm-stem 30, which is in contact with the regulating-spring 31, the pressure whereof is subject to control by means of the regulating-nut 32.

The chamber 33 is in open communication with the train-pipe, and this permits the train-pipe pressure to act against one side of the diaphragm 28 in a direction to counteract the force of the spring 31. Leading from the chamber 33 to the chamber 34 between the diaphragms 28 and 29 is a duct or passage 35, subject to control by means of a manually-operated device or three-way cock 36, which when communication between the chambers 33 and 34 is cut off, as it is in the view shown in Fig. 2, serves to establish communication through the outlet 37 between the chamber 34 and the atmosphere.

The operation of the mechanism just above described is as follows: Air entering the casing 16 from the main reservoir through the port 18 immediately acts upon the supply-piston 21 to open the supply-port 23 and permit pressure to accumulate in the train-pipe and passages connected therewith, one of which is in communication with the chamber 33 by means of the duct or passage 33ª, the air which leaks past the supply-piston 21 into the chamber 22 also passing to the train-pipe through the duct 24 and passing the controlling-valve 25, which is held open by the force of the spring 31 until the train-pipe has been charged with sufficient pressure to overcome the pressure of the spring 31, at which time the pressure in the train-pipe, which is in communication with the chamber 33, pushes the diaphragm 28 over against the force of the spring 31 and permits the controlling-valve spring 25ª to seat the controlling-valve and cut off further escape of pressure from the chamber 22, which will then equalize with the pressure in the main reservoir by the continued leakage past the piston 21 and permit the supply-valve spring 22ª to push the supply-valve 20 over and cut off further supply of air to the train-pipe, the supply-valve at this time being in the position shown in Fig. 3 and the controlling-valve closed. As the pressure in the train-pipe reduces, the spring 31 acts to open the controlling-valve again and permit the escape to the train-pipe of the accumulated pressure in the chamber 22, when the excess of pressure that will then be left upon the main-reservoir side of the supply-piston will reopen the slide-valve and reëstablish communication between the main reservoir and the train-pipe.

In the operation as above described the diaphragm of lesser area 29 plays practically no part, since the chamber which is adapted to contain the pressure designed to coöperate with this diaphragm (in the position of the cock 36 shown in Fig. 2) is in open communication with the atmosphere through the outlet 37. If now it be desired to alter the mechanism so that the feed device will cut off at a higher pressure, the cock 36 is moved around so as to establish communication through the duct 35 between the chamber 33 and the chamber 34, which balances the pressures on the opposite sides of the diaphragm 28, rendering the same inoperative, and causes the pressure to become effective against the diaphragm 29 which has a smaller area than the diaphragm 28 and will therefore require a higher pressure before it will exert sufficient force upon the spring 31 to permit the controlling-valve 25 to seat. The diaphragm 29 then becomes the operative part or actuating abutment, while the diaphragm 28 being placed in equilibrium becomes inoperative. It will now be seen that by proper proportioning of the areas of the diaphragms 28 and 29 the device can be made to close the controlling-valve at any two degrees of pressure which may be desired. It will also be seen that by the provision of three or more diaphragms similarly arranged in conjunction with a corresponding number of ports in the controlling-cock the mechanism could be made to operate at any one of a number of different pressures.

Referring now to the device shown in Fig. 4, it will be seen that I have applied my improvements to the governor which regulates the action of the compressor in a manner similar to that shown in Figs. 2 and 3. In this figure the steam which supplies the compressor enters through the passage 38 and forcing the throttle-valve 39 open escapes at the outlet 40. The throttle-valve 39 is connected, by means of a stem 41, with the piston 42, above which there is a chamber 43, supplied with pressure through a port 44, controlled by a valve corresponding to the controlling-valve 25, which is adapted to be moved by the diaphragms 28 and 29 against the resistance of the spring 31 in a manner substantially like that already explained in connection with the structure shown in Figs. 2 and 3, save that in Fig. 4 the controlling-valve 25 is so disposed as to open when the spring 31 is compressed instead of closing at such time. The chamber 33 of this figure is connected with the chamber 34 by a duct 35, controlled by a three-way cock 36 in substantially the same manner as in Figs. 2 and 3. The inlet to the chamber 33 in the structure shown in Fig. 4 is preferably connected with the main reservoir, and when the pressure acts upon either of the diaphragms to overcome the resistance of the spring it passes the controlling-valve 25 and acting against the piston 42 forces the throttle-valve 39 shut, cutting off the supply of steam to the compressor. Except in so far as this construction embodies my novel arrangement of double diaphragm coöperating with a single controlling-valve and spring it is substantially like the form of pump-governor now in common use.

It will be observed that in the device shown both in Fig. 2 and in Fig. 4 the spring 31 bears against a shoulder formed upon the stem 30, within which the bolt 27 has screw-threaded engagement, the stem of the bolt $27^a$ passing through both of the diaphragms, which are spaced apart by means of an intermediate washer $27^b$, which also acts as a backing for the diaphragm 28. The enlarged end $30^a$ of the stem 30, which forms the backing for the diaphragm 29, has, as clearly shown, a smaller diameter than the washer $27^b$, and the enlargement $30^a$ moves within an opening in a diaphragm-ring which is smaller than the opening in the diaphragm-ring $28^a$, whereby the effective area of the diaphragm 29 is made less than the effective area of the diaphragm 28, although the diaphragms themselves are shown as having the same diameter over all.

It will be evident from an examination of my invention, as above disclosed, that I have provided a mechanism in which there is required but a single spring and but a single adjustment, although it is adapted to control at a plurality of different pressures. The difference in pressure is determined by a proper proportioning of the effective areas of the two diaphragms or by other equivalent structural provisions, and once having been determined always remains correct and cannot in any manner be altered or interfered with by any manipulation of the device in the hands of the operator. If a little higher pressure is desired, both pressures can be raised by the proper manipulation of the single adjusting-screw, and if it is desired to lower the pressures this also can be done in both instances by the proper manipulation of the screw.

Having thus described my invention, what I claim as new, and desire to secure by Letters Patent, is—

1. In a fluid-pressure mechanism, the combination with a main supply-valve and a piston for operating the same, of a feed-valve for controlling the pressure on one side of said piston, a spring for moving the feed-valve in one direction, two diaphragms exposed to fluid-pressure opposing said spring, and means for bringing either one of said diaphragms into operation at will.

2. In a fluid-pressure mechanism, the combination with a main supply-valve and a piston for operating the same, of a feed-valve for controlling the pressure on one side of said piston, a spring acting on said feed-valve, two diaphrams having different effective areas exposed to fluid-pressure and opposing said spring, and a cock for bringing either one of said diaphragms into operation at will.

3. In a fluid-pressure mechanism, the combination with a main supply-valve and a piston for operating the same, of a feed-valve for controlling the pressure on one side of said piston, an adjustable spring for opening said feed-valve, two diaphragms having different effective areas exposed to fluid-pressure for opposing the action of said spring, and a cock for connecting the space between the diaphragms either with the atmosphere or with the chamber on the opposite side of one of the diaphragms.

4. In a fluid-pressure brake mechanism, the combination with a main supply-valve for controlling the flow of fluid from the main reservoir to the train-pipe, and a piston for operating said valve, of a feed-valve for controlling the release of fluid from one side of said piston to the train-pipe, a spring for opening the feed-valve, two diaphragms having different effective areas adapted to be exposed to train-pipe pressure and opposing the action of said spring, and means for bringing either one of said diaphragms into operation at will.

5. In a fluid-pressure brake mechanism, the combination with a main supply-valve for controlling the flow of fluid from the main reservoir to the train-pipe, and a piston normally exposed to main-reservoir pressure for operating said valve, of a feed-valve for controlling the release of fluid from one side of said piston to the train-pipe, a spring for moving the feed-valve in one direction, two diaphragms having different effective areas and adapted to be exposed to train-pipe pressure for opposing the action of said spring, and a cock for permitting the effective pressure to act upon either one of said diaphragms.

In testimony whereof I have hereunto set my hand in the presence of two subscribing witnesses.

HARRY R. MASON.

Attest:
PAUL CARPENTER,
H. W. SMALLEY.